Oct. 4, 1955  J. H. FLYNN  2,719,902
MULTI-ELEMENT ELECTRODE
Filed July 22, 1953  3 Sheets-Sheet 1

INVENTOR
James H. Flynn
BY J. E. Ross
ATTORNEY

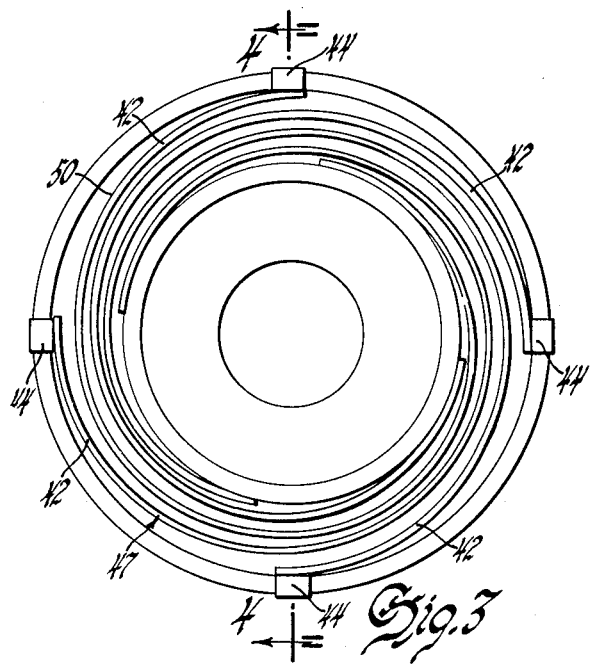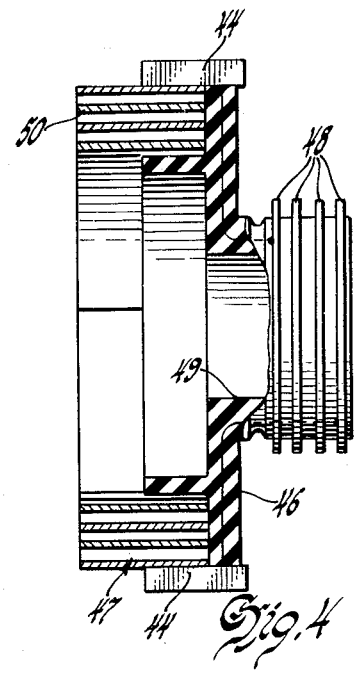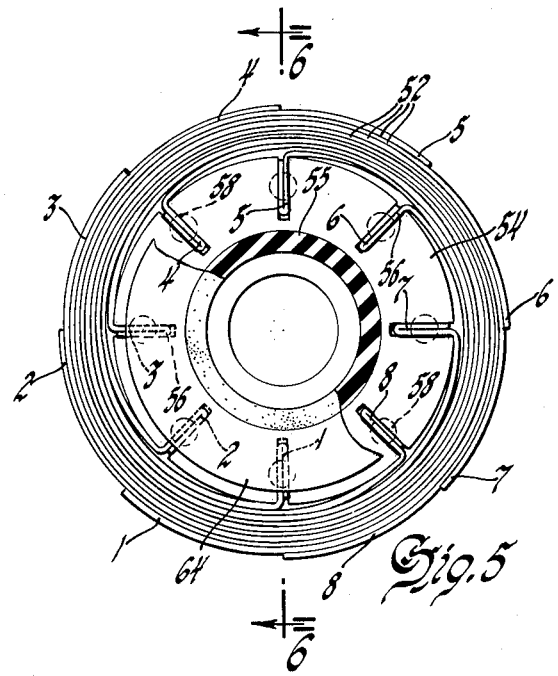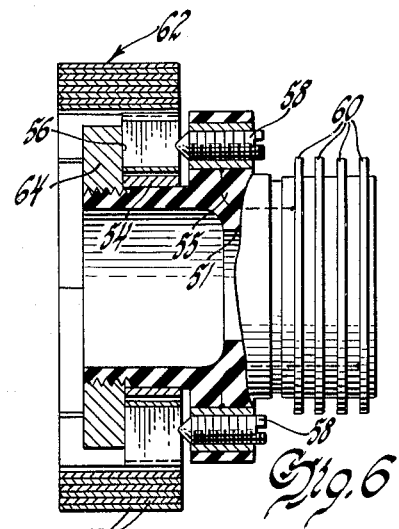

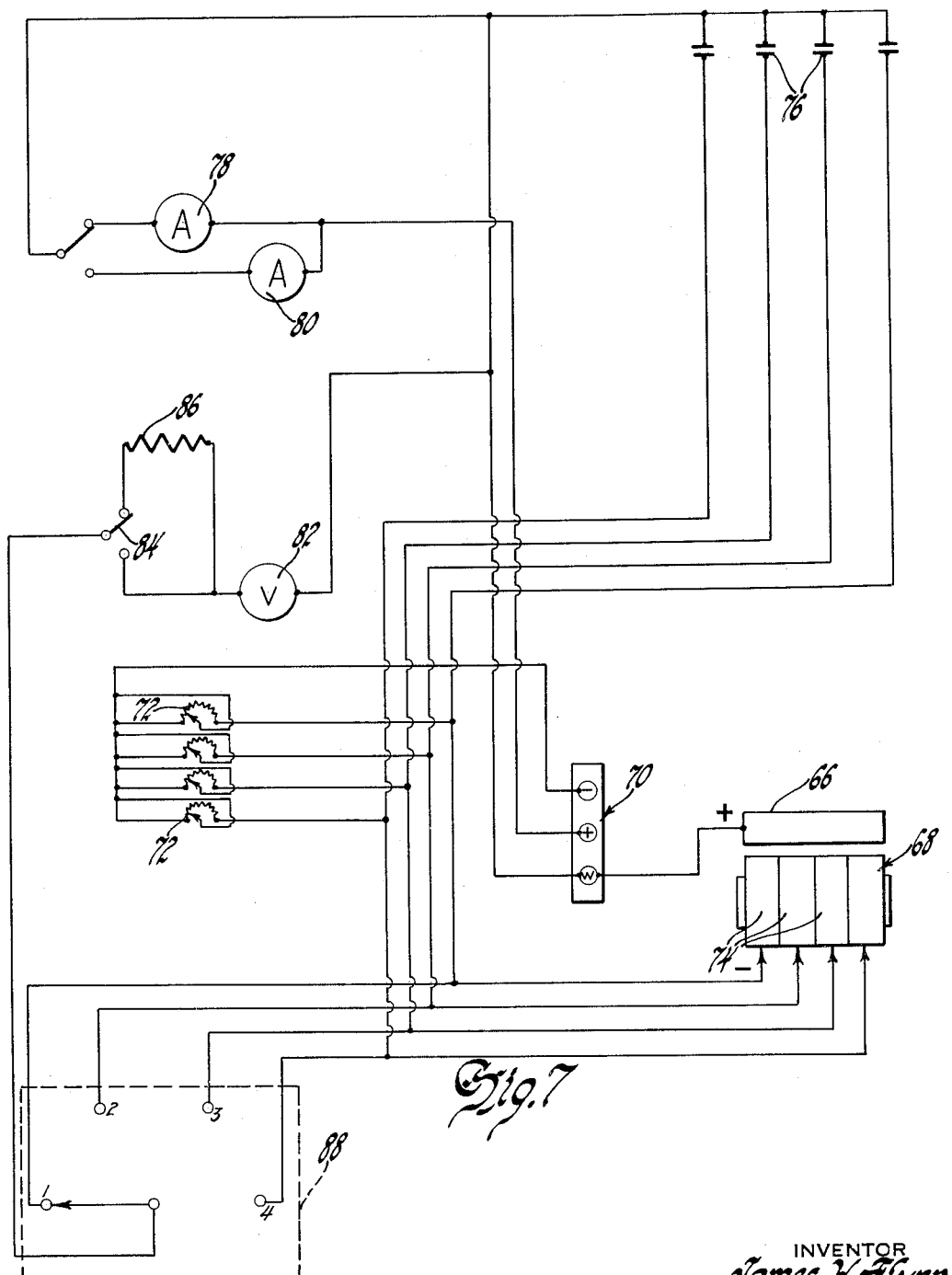

United States Patent Office 2,719,902
Patented Oct. 4, 1955

2,719,902

MULTI-ELEMENT ELECTRODE

James H. Flynn, Birmingham, Mich., assignor to General Motors Corporation, Detroit, Mich., a corporation of Delaware Application July 22, 1953, Serial No. 369,567

14 Claims. (Cl. 219—15)

This invention relates to the removal of electroconductive material in electrical type cutting and/or grinding operations, and more particularly to improvements in the cutting or grinding of extremely hard electroconductive materials.

Up to the present time some use has been made of electrical type cutting and/or grinding methods, generally referred to as electro-erosion or electrolytic cutting. Typical prior electrical type cutting or grinding operations employ some form of apparatus which provides a source of pulsating electrical energy and includes a metallic cutting or grinding wheel-shaped electrode adapted to rotate at high speeds. In operation, the wheel-shaped electrode is connected to one electrical terminal; and a workpiece, typically a carbide cutting tool, the surface of which is to be cut or ground, is connected to the opposite electrical terminal. Hence, as the rotating electrode and the workpiece are brought together an electrical discharge occurs therebetween and electroconductive material is removed from the workpiece. Control of such cutting and grinding operations is usually effected by regulating the capacitance and resistance of the electrical supply circuit as well as the method of bringing the workpiece and electrode together. In many instances superior results are obtained by providing a dielectric fluid medium between the surfaces of the electrode and workpiece to facilitate the removal of electroconductive material.

While the aforementioned electrical cutting and grinding methods do provide means for cutting hard electroconductive materials such as sintered tungsten carbide and the like, such methods have not been widely used commercially because of the relatively low rate of removal of the electroconductive material from the workpiece. Accordingly, even though conventional diamond type abrasive cutting and grinding wheels are much more costly than electrical type equipment, diamond wheels still are used in most industrial cutting and grinding of hard tool materials inasmuch as they provide a much faster rate of grinding or cutting.

In prior electrical cutting and grinding operations, the workpiece and the wheel electrode, connected to opposite electrical terminals, provide as they are brought together but a single electrical discharge path. The rate of material removal in electrical cutting and grinding operations is approximately proportional to the frequency of electrical spark discharge between the workpiece and the moving electrode. Up to the present time, attempts have been made to provide optimum electrical discharge characteristics by regulating the circuit resistance and capacitance. However, such attempts have heretofore failed to provide a sufficiently rapid rate of cutting or grinding to be commercially feasible as a replacement for the expensive diamond type cutting and grinding wheels.

Accordingly, one object of the present invention is the provision of electrical cutting or grinding apparatus capable of removing electroconductive material at a greatly increased rate. A further object is the provision of an improved electrode member for electrical cutting and/or grinding operations. A further object is the provision of an improved electrode member adapted to provide rapid cutting and/or grinding of extremely hard electroconductive material at a relatively low cost. A still further object is the provision of improved electrical type cutting and grinding apparatus capable of maintaining a high rate of stock removal while providing a uniformly smooth surface even without reciprocation of the workpiece.

In accordance with the present invention, a greatly increased rate of cutting or grinding is obtained by employing apparatus utilizing a plurality of electrical discharge circuits, each circuit provided with suitable capacitance and resistance to provide optimum electrical discharge characteristics. As a result, a greatly increased electrical spark discharge frequency can be provided with a corresponding increase in the rate of cutting or grinding. In practice, a plurality of electrical discharge circuits are provided to terminate in an improved wheel-shaped electrode which comprises a number of electroconductive segments individually insulated from each other and spirally disposed to provide a plurality of electrical discharge paths sweeping across the face of the workpiece as the electrode is rotated.

The improved electrode preferably comprises a number of spirally disposed metallic segments in the form of disks or strips, either spirally interleaved or spirally wound into the desired wheel shape.

In operation, each segment is connected to a separate electrical discharge circuit. A wheel electrode formed in accordance with the present invention is readily connected into an electrical supply circuit thus facilitating replacement and adjustment of electrodes during operation, as well as improving the operational characteristics of the process. A further advantage in using such a wheel electrode in electrical grinding is most pronounced in form eroding operations wherein no grooves or other wheel patterns are produced in the surface of workpiece as would be the case if the wheel segments were placed side by side or were not spirally wound.

The invention will be more readily understood taken in connection with the accompanying drawing, in which:

Fig. 3 is a somewhat schematic plan view of a modified form of multi-element electrode in accordance with the invention;

Fig. 4 is a view partially in section taken along the line 4—4 of Fig. 3;

Fig. 4a is an enlarged schematic sectional view of one electroconductive segment in accordance with the invention;

Fig. 5 is a schematic view partially in section of another modification of a multi-element electrode in accordance with the invention;

Fig. 6 is a view partially in section taken substantially along the line 6—6 of Fig. 5, and Fig. 7 is a schematic wiring diagram of a suitable electrical supply circuit in accordance with the present invention.

Figure 1:
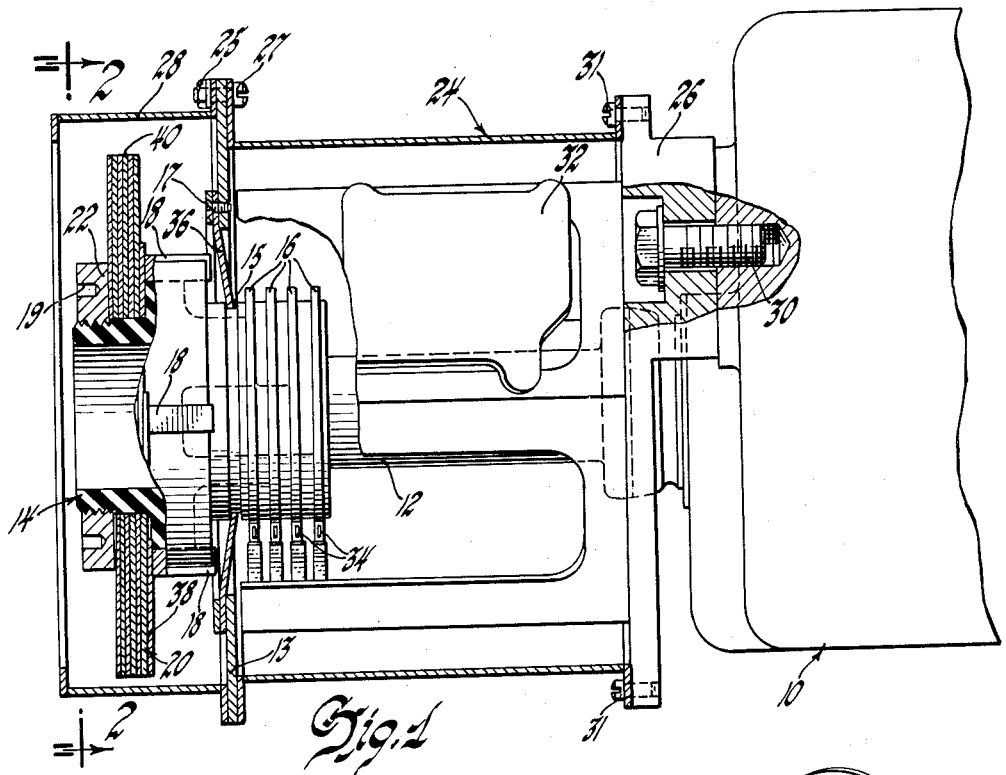
Fig. 1 is an elevational view partially in section and with parts broken away of an electrical type cutting and grinding apparatus embodying the invention.

Referring more particularly to the figures of the drawings, in Fig. 1 is shown in some detail one embodiment of an electrical type cutting and grinding apparatus in accordance with the present invention. The apparatus comprises a motor unit, indicated generally at 10, which serves as driving means for a spindle 12 extending therefrom. Secured to the spindle 12 is an electrode adapter member formed of an electrically non-conductive material and indicated generally at 14. The electrode adapter is provided with a plurality of slip rings 16 positioned around a portion of its length, each of said slip rings being electrically connected to a separate contact element 18 adapted to complete an electrical circuit through one segment of a multi-element wheel electrode. As shown in Fig. 1, a multi-element wheel electrode, indicated generally at 20, is secured to the electrode adapter 14 by an annular retaining ring 22 threadedly secured on the electrode adapter 14 and provided with openings 19 to permit tightening the ring in place.

Provided around the wheel electrode 20 and associated structure is a protective housing which is designated generally at 24 and is secured by a plurality of machine screws 31 to a base plate 26 which in turn is attached to the motor drive unit 10 by a number of bolts 30. The housing 24 is provided with a movable inspection plate 32 to facilitate adjustment and inspection of the electrical connections. Removably secured to the housing 24 by a plurality of nuts 25 and bolts 27 is a protective shield 28 adapted to prevent injury and to retain cutting and grinding fluids. Provided within the housing 24 are a plurality of electrical brushes 34, typically of silver graphite, adapted to contact the slip rings 16 and establish an electrical circuit through each segment 38 of the multi-element electrode 20. A flexible shield 36, held in place by an annular retaining ring 13 and a plurality of machine screws 17, and fitting in groove 15 around the periphery of the electrode adapter 14, provides a liquid seal to prevent short-circuiting by entry of fluids within the housing.

Figure 2:
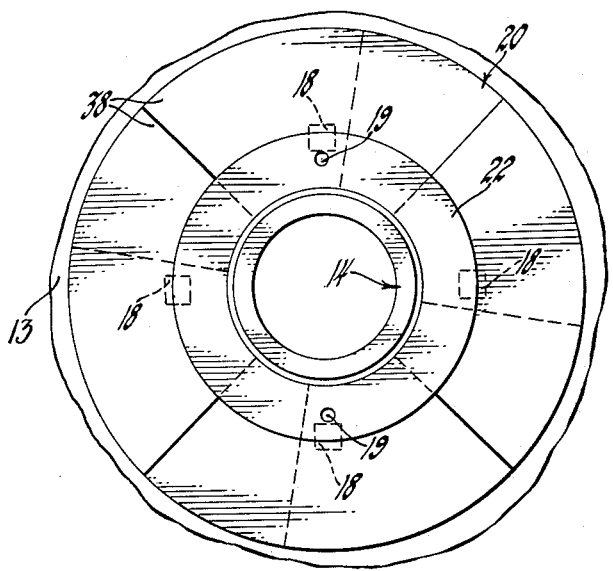
Fig. 2 is a fragmentary view taken along the line 2—2 of Fig. 1 illustrating, in somewhat schematic form, construction details of one type multi-element electrode in accordance with the invention.
Figure 2A:
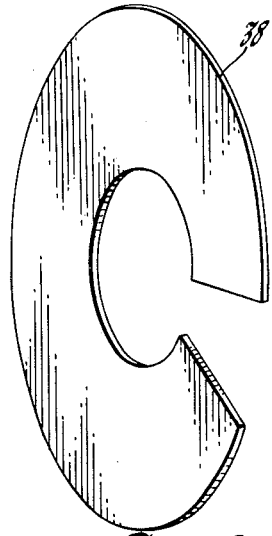
Fig. 2a is a perspective view illustrating one segment of the type from which the electrode illustrated in Fig. 2 is formed.

The multi-element electrode 20 is formed from a number of metallic annular disks 38 having sectors removed therefrom as illustrated in Fig. 2a, each of the disks being initially coated with a thermosetting electrically insulating binder material such as phenol-formaldehyde, melamine-formaldehyde, etc. A number of these coated disks are spirally interleaved and the interleaved assembly in the form of a straight type wheel electrode is subjected to heat and pressure to convert the binder material into a hard insoluble state. It will be seen that by spirally interleaving a plurality of insulated metal segments, the resultant wheel structure 20 will provide on each end face thereof an exposed portion of each electro-conductive segment. Hence, it is a simple matter to establish a plurality of electrical discharge paths through the electrode by positioning each of the metallic segment contactor elements 18 in the electrode adapter 14 in abutting relationship with one of the electrode segments. Electrical discharges pass through each of the brushes 34, the slip rings 16, the contactor elements 18 and thence to each metallic segment. In such a manner, when a workpiece is pressed against the outer cylindrical surface 40 of the rotating electrode, a plurality of electrical discharges occur, each discharge path sweeping uniformly across the surface of the workpiece to provide a multiplicity of electrical discharge paths evenly distributed over the surface of the workpiece.

It will be understood, of course, that any number of spirally interleaved segments may be employed; other factors being constant, the frequency of the electrical discharge being approximately proportional to the number of metallic segments employed. I have found that in most applications a spirally interleaved multi-element electrode embodying about 4 to 10 segments produces excellent results. In operations employing a straight type wheel electrode as shown in Figs. 1 and 2, it is a simple matter to replace worn electrode elements inasmuch as it is only necessary to replace the assembly of bonded spirally interleaved segments, the electrical contact elements 18 in the electrode adapter 14 being suitable for a variety of types of multi-element electrodes in accordance with this invention. By utilizing a wheel of the aforementioned straight type it is possible to obtain excellent results in form eroding or form grinding by shaping the outer surface 40 of the wheel into any desired shape by a master cutter. Inasmuch as the plurality of electrical discharges uniformly sweep across the surface of the workpiece as the wheel rotates, there is no necessity of reciprocating the workpiece with respect to the electrode in order to obtain smooth surface. In most instances, satisfactory finishes free from wheel patterns can be obtained even in plunge cuts.

Figs. 3 and 4 illustrate in somewhat schematic form a cup type multi-element electrode in accordance with the invention utilizing a plurality of spirally wound metallic strips 42, each strip individually insulated from the others and terminating at a contact bar 44 in an electrode adapter 46. As shown in Fig. 4 the annular shaped, spirally wound electrode assembly, indicated generally at 47, is removably secured to an electrode adapter 46 and each of the contact bars 44 is electrically connected through the adapter member to a slip ring 48 in order to establish a plurality of electrical discharge circuits. The plurality of electrical discharge paths, established by the spirally wound metallic strips, sweep across the face of a workpiece as the multi-element wheel rotates. In such a wheel structure the cup surface 50 of the multi-element wheel provides an improved cutting or grinding surface especially useful in the sharpening of single point carbide cutting tools.

Figs. 5 and 6 illustrate another embodiment of a cup type multi-element electrode in accordance with the invention in which a number of metallic strips 52, each individually insulated from the others, and designated, for clarity, as 1, 2, 3, 4, 5, 6, 7, and 8 are spirally wound around the periphery of a core or adapter ring 54. As shown in Fig. 5 one end of each metallic strip 52 is secured within a radial slot 56 in the adapter ring 54 in such a manner as to abut an electrical contact element 58 each of which in turn is electrically connected through an electrode adapter 55 to a slip ring 60 in order to establish a plurality of electrical discharge circuits.

It will be observed that the modified multi-element electrodes as shown in Figs. 3, 4, 5 and 6 can be employed with the same type electrode adapter as used with the straight type wheel shown in Figs. 1 and 2. As illustrated in Fig. 6, the multi-element electrode structure, indicated generally at 62, is retained in position against electrical contact elements 58 by an annular ring 64 threadedly engaging the electrode adapter 55. It will be understood, of course, that the invention is not to be limited to the use of slip ring and brush type electrical contacts as illustrated in Figs. 1, 4 and 6. In certain applications the electrical contact means may be disposed within the electrode adapter, as for example, at 49 or 51.

In multi-element electrodes in accordance with the invention the electro-conductive strips or segments can be formed of any desired metals or alloys such as aluminum, steel, copper and the like. Inasmuch as the cutting and/or grinding action is not dependent upon either the area of contact between the wheel electrode and the workpiece, or the hardness of the material from which the electrode is made, it is possible to form a multi-element wheel structure having any desired shape from easily worked metals. It is essential, however, that the metallic segments or strips employed in the multi-element electrode be electrically insulated from each other. In practice, this is conveniently accomplished by applying to each of the metallic segments or strips a heat-curable, electrically insulating adhesive material. In the manufacture of such a wheel electrode the metallic segments or strips are initially coated, for example, as shown in Fig. 4a, with such an electrically insulating adhesive material, are then formed into the desired shape, and are subsequently heat treated, preferably under pressure, to convert the adhesive into a hard tough binder. In a typical multi-element wheel structure the individual metallic laminations are coated with a heat-curable adhesive in a thickness of about .015" and the adhesive is cured by applying a pressure of about 200 p. s. i. for 10 minutes while the wheel structure is maintained at a temperature of about 400° F.

In Fig. 7 is shown a schematic wiring diagram of an electrical circuit providing a plurality of electrical discharge paths in accordance with the invention. The circuit is adapted to provide a pulsating direct current discharge between a workpiece 66, maintained as the positive terminal, and a multi-element wheel electrode 68, maintained as a plurality of negative electrodes. A source of pulsating D. C. current, provided by a conventional type rectifier (not shown) is fed into input terminal 70. This input current is regulated by a plurality of variable resistors 72, each resistor connected in series with one of the electroconductive segments 74 of the multi-element wheel electrode 68. A plurality of condensers 76 are provided across the electrical lead wires which contact the individual wheel segments 74 and the workpiece 66. The effect of such a circuit arrangement, employing a pulsating D. C. input, is to charge the condensers 76 through the resistors 72 and then to provide a rapid condenser discharge through the low resistance portion of the circuit and the workpiece. The magnitude of the electrical resistance controls the rate of condenser charge and, together with the condensers, determines the time constant of the circuit operation.

Ammeters 78 and 80 are provided to indicate the current magnitude, ammeter 80 being employed when it is desired to measure low-scale amperages typically employed in finish operations. Similarly, a voltmeter 82 is provided to indicate the voltage across the workpiece and multi-element electrode, switch 84 and a resistor 86 provided to permit switching from a high-voltage scale to a low-voltage scale when desired. A selector switch, indicated generally at 88, provides means for measuring individual voltages between the workpiece and particular electroconductive wheel segments.

Generally speaking, for optimum cutting and grinding rates a relatively large voltage and amperage are provided at the input 70. In one particular application, voltages within the ranges of about 50 to 150 volts and amperages of about 10 to 30 amperes have provided excellent results, although it will be understood that the invention is not limited to any particular voltage or amperage, but that the principle embodied in the invention may be applied with a wide variety of voltages and amperages.

In practice, a technique somewhat different from conventional workpiece feed is employed in the feeding of the workpiece against the moving electrode. Inasmuch as little or no heat is developed in the electrical cutting or grinding, the workpiece can be maintained in substantially continuous contact with the electrode and for optimum efficiency should be. Consequently, the work is fed in a plunge type cut or, if desired, is slowly reciprocated across the face of the wheel electrode. The spacing between the workpiece and the electrode is critical if optimum speeds of cutting and grinding are to be realized. While it will be understood that the preferred distance in a particular application depends upon several factors including the voltage employed, a typical spark gap, using 60 volts, is about .001 to .002 inch, and at 20 volts, about .0001 to .0002 inch.

Various changes and modifications of the embodiments of the invention described herein may be made by those skilled in the art without departing from the spirit and principles of the invention.

What is claimed is:

1. An electrode for use in electrical cutting and grinding operations, said electrode comprising a plurality of generally annular, spirally disposed electroconductive segments in electrically non-conductive relationship with respect to one another.

2. A multi-element electrode for use in electrical cutting and grinding operations, said electrode comprising a plurality of spirally disposed, electroconductive segments adapted to provide in operation a number of electrical discharge paths each of which sweeps spirally across the surface of a workpiece.

3. A multi-element electrode member for use in electrical type cutting and grinding operations, said electrode member comprising a plurality of electroconductive annular disks, said disks spirally interleaved to form a cylindrical type wheel-shaped electrode having exposed on the edge surfaces thereof a portion of each of said annular disks.

4. An electrode member for use in electrical cutting and grinding operations, said electrode member comprising an annular ring structure consisting of a plurality of spirally wound metallic strips of generally annular shape electrically insulated from one another, each of said strips overlapping the other strips and having one end thereof connected to an electrical contact member.

5. A multi-element electrode assembly for use in electrical type cutting and grinding operations, said electrode assembly comprising an electrode adaptor provided with a plurality of electrical contact means, and a multi-element electrode which consists essentially of a plurality of spirally wound metallic strips of generally annular shape, each of said strips being electrically insulated from the others and having one end thereof connected to electrical contact means on said electrode adaptor.

6. A multi-element electrode for use in electrical cutting and grinding operations, said electrode comprising a rotatable core member and a plurality of spirally wound electroconductive strips of generally annular shape secured to said core member, each of said electroconductive strips being insulated electrically from the others and provided with means for electrical connection to a separate electrical circuit, said strips each being located in overlapping relationship with respect to the other of said strips.

7. A multi-element electrode for use in electrical cutting and grinding operations, said electrode comprising an annular core member having around its circumference a plurality of radial slots and a plurality of generally annular metallic strips spirally wound about said core in electrically non-conductive relationship with respect to one another, each of said strips being secured in one of said radial slots and provided with an outer edge adapted to sweep spirally across the surface of a workpiece.

8. A multi-element electrode assembly for use in electrical cutting and grinding operations, said assembly comprising an electrode adaptor having electrical contact means and a multi-element cup-shaped electrode member removably secured to said adaptor member, said multi-element electrode member comprising an annular ring-shaped core member provided with a plurality of radial slots and a corresponding number of spirally wound metallic strips, each of said strips electrically insulated from the others and having one end thereof inserted in a radial slot in said core member, said electrode adaptor provided with an adjustable means to establish electrical contact between each of said metallic strips and a separate source of electrical energy.

9. An electrode assembly for use in electrical type cutting and grinding operations, said assembly comprising an adaptor and a rotatable electrode provided with a plurality of spirally disposed electroconductive elements of generally annular shape electrically insulated one from another, said adaptor consisting essentially of a cylindrical member adapted to support said electrode during operation and having means thereon for establishing a plurality of electrical contacts adapted to electrically connect each of said elements to a separate source of electrical energy.

10. Apparatus for electrical type cutting and grinding operations, said apparatus comprising drive means, a spindle driven thereby, a multi-element electrode having a plurality of spirally disposed electroconductive segments of generally annular shape mounted on said spindle, and a plurality of electrical discharge circuits terminating in said multi-element electrode.

11. Apparatus for electrical type cutting and grinding operations, said apparatus comprising drive means, a driven spindle, and an electrode assembly mounted on said spindle for rotation, said electrode assembly comprising a multi-element electrode provided with a plurality of individually insulated electroconductive segments and an adaptor member, said adaptor having current conducting means associated therewith to transmit electrical energy to said electroconductive segments, each of said segments being spiral shaped and positioned in overlapping relationship with respect to the other of said segments.

12. Apparatus for electrical cutting and grinding operations, said apparatus comprising drive means, a rotatable spindle driven by said drive means, an electrode assembly mounted on said spindle for rotation, said electrode assembly comprising a multi-element electrode having a plurality of spirally disposed electroconductive segments, an electrode adaptor provided with a plurality of electrical contacts each of said contacts in abutting relationship with one electroconductive segment of said multi-element electrode.

13. In an electrical type cutting and grinding apparatus of the type comprising a drive means, a driven spindle, an electrode member mounted on said spindle, and a source of electrical energy, the improvement which consists in employing a multi-element electrode formed from a plurality of spirally disposed electroconductive segments individually electrically insulated from each other and having edges providing in operation a multiplicity of electrical discharge paths which sweep spirally across the surface of a workpiece.

14. Apparatus for electrical type cutting and grinding operations, said apparatus comprising a plurality of sources of electrical energy, a motor drive unit, a spindle driven thereby, an electrode assembly secured to said spindle for rotation, said electrode assembly comprising an electrode adaptor and a multi-element electrode, said adaptor having a plurality of electrical contact means associated therewith for establishing a flow of electrical energy from said sources of electrical energy to said multi-element electrode, said electrode formed of a plurality of spirally disposed electrically insulated metallic segments bonded into the desired shape.

References Cited in the file of this patent

UNITED STATES PATENTS

| | | |
|---|---|---|
| 1,226,350 | Mark | May 15, 1917 |
| 1,502,140 | Hunter | July 22, 1924 |
| 2,526,423 | Rudorf | Oct. 17, 1950 |